No. 820,478. PATENTED MAY 15, 1906.
J. H. CROSKEY.
APPARATUS FOR MANUFACTURING GLASS ARTICLES.
APPLICATION FILED MAY 10, 1905.
2 SHEETS—SHEET 1.
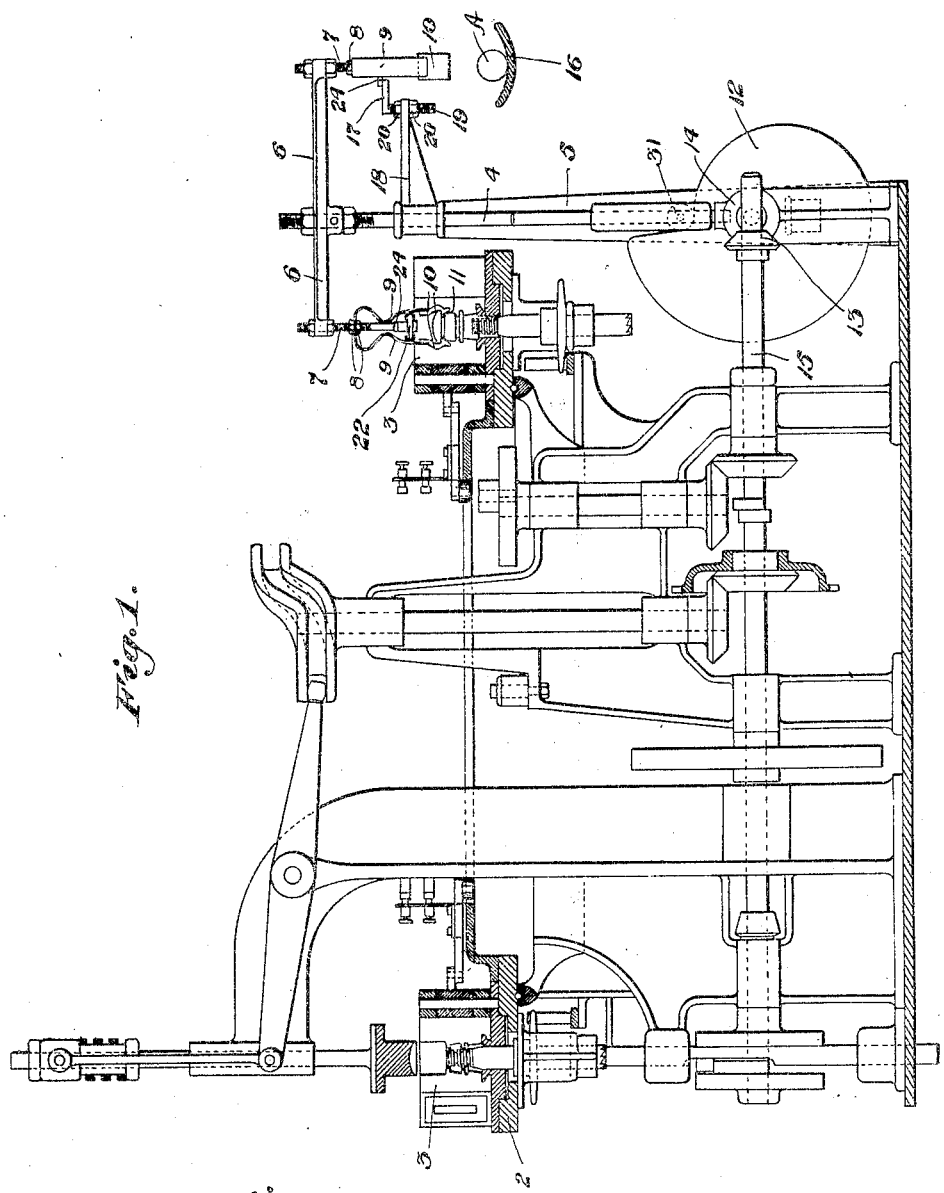
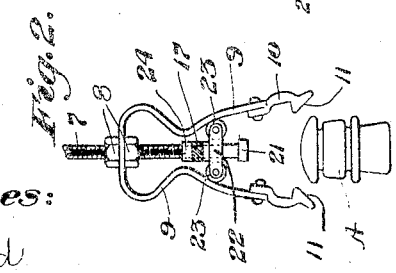
Witnesses:
E. R. Rodd
Chas. Shipley
Inventor:
John H. Croskey
by O. M. Clarke
his Attorney No. 820,478. PATENTED MAY 15, 1906.
J. H. CROSKEY.
APPARATUS FOR MANUFACTURING GLASS ARTICLES.
APPLICATION FILED MAY 10, 1905.
2 SHEETS—SHEET 2.
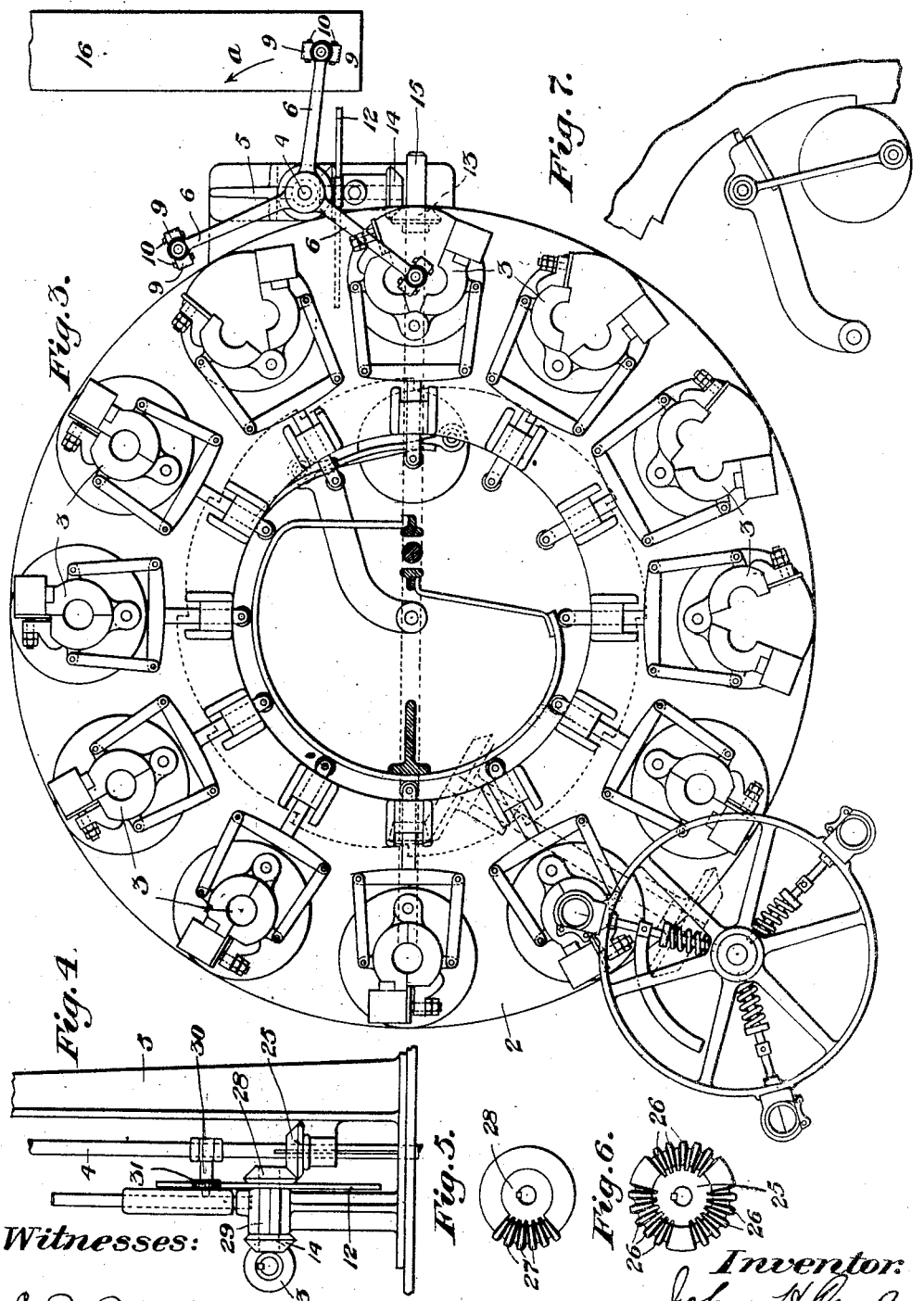
Witnesses:
E. R. Rodd.
Chas. Stepley
Inventor:
John H. Croskey
by O. M. Clarke
his attorney

UNITED STATES PATENT OFFICE.

JOHN H. CROSKEY, OF PITTSBURG, PENNSYLVANIA, ASSIGNOR TO DUQUESNE GLASS COMPANY, OF PITTSBURG, PENNSYLVANIA, A CORPORATION OF PENNSYLVANIA.

APPARATUS FOR MANUFACTURING GLASS ARTICLES.

No. 820,478.     Specification of Letters Patent.     Patented May 15, 1906.

Application filed May 10, 1905. Serial No. 259,753.

*To all whom it may concern:*

Be it known that I, JOHN H. CROSKEY, a citizen of the United States, residing at Pittsburg, in the county of Allegheny and State of Pennsylvania, have invented certain new and useful Improvements in Apparatus for Manufacturing Glass Articles, of which the following is a specification, reference being had therein to the accompanying drawings, forming part of the specification, in which—

Figure 1 is a view in vertical sectional elevation of my improved molding apparatus for forming plastic material provided with my improved discharging mechanism. Fig. 2 is an enlarged detail view showing the lifting device open in the action of releasing the finished article. Fig. 3 is a plan view of the apparatus, showing the relative location of the discharging device. Fig. 4 is a detail view in elevation illustrating the mechanism for vertically reciprocating and rotating the main carrying-stem. Figs. 5 and 6 are detail views illustrating the mutilated gearing for transmitting intermittent rotating movement to said shaft. Fig. 7 is a detail view of the ratchet-arm for intermittently rotating the table.

My invention refers to improvements in apparatus for forming articles of plastic nature, as glass, the machine shown being particularly designed for the manufacture of insulators for telegraph or other wires.

The present invention refers particularly to the mechanism for lifting the finished articles out of the mold and discharging them upon any suitable receiving means.

Referring now to the drawings illustrating the invention, 2 is the rotating table of the machine, provided with a plurality of molds 3, adapted to receive the molten glass and to mold the finished article under pressure of a suitable plunger, as is the common practice in this class of apparatus.

The machine generally is similar to the one shown and described in my prior application, filed June 10, 1904, bearing the Serial No. 211,904, and is provided with suitable means for intermittently rotating the table step by step, so as to bring the molds successively into proper position for being filled with the plastic material, pressing the material therein by the usual plungers adapted to form the article, and to provide it with an interior thread, and to finally locate the molds in opened position at a point where, during the stationary period of the apparatus, the finished article may be lifted away and discharged. Ordinarily this operation is performed manually, and my invention is designed to provide means arranged to grasp the finished insulator, raise it, swing it around, and drop it upon an inclined chute or any convenient conveying means by which the articles may be conveyed away from the machine. This result is secured by means of a vertically-reciprocating intermittently-rotating spindle 4, mounted in a suitable frame 5 in convenient proximity to the machine for coöperating with the proper mold, the spindle 4 being provided at its upper portion with a plurality, preferably three, of spider-arms 6, secured upon the upper portion of the spindle, as shown in Fig. 1, having downwardly-extending stems 7 so located with relation to the center of each mold when brought into registering position that these stems will vertically aline therewith during the non-rotating period of both the machine and the discharging device.

Secured upon the stem by nuts 8 or otherwise, and preferably vertically adjustable thereon, are spring-arms 9 9, provided with gripping-terminals 10, having inwardly-projecting lips adapted to engage under the top portion or cap of the insulator A, as clearly indicated in Figs. 1 and 2. The inner portions of the gripping-terminals are flared or inclined, as shown at 11, whereby they will slide down over the top of the article and automatically engage underneath its head, as will be readily understood.

For the purpose of raising the spindle 4 at the proper time and of lowering the gripping-terminals 10 upon the insulator I provide a cam 12, driven through bevel-gearing 13 14 from the main shaft 15 of the machine, whereby said cam makes one complete revolution for each periodic intermittent rotative movement of the table, the cam being so designed that it will cause the spindle 7 and its grasping-tool to gradually rise and will allow it to drop downwardly over the insulator at the proper time. The cam then immediately raises the spindle, carrying with it the insulator and lifting it free of the mold during its stationary period, and the spindle 4 is then partially rotated in the direction of the arrow $a$, Fig. 3, a fraction of a complete revolution, preferably one-third when three arms are employed, so as to bring the tool of one arm and the suspended article into registering position with a receiving chute or carrier 16, upon which the article is to be dropped, and to also bring the next adjacent tool into register with the next mold to grasp the insulator therein. The grasping and carrying tool of the loaded arm is designed to be opened at the time the spindle 4 drops for the next grasping operation, and for this purpose I provide a stationary abutment 17, mounted in arm 18 by means of a stem 19, preferably threaded and provided with securing-nuts 20, whereby the stem and abutment may be delicately adjusted to the desired height.

Slidingly mounted on the lower part of stem 7 and normally resting against a terminal collar 21 thereon is a yoke 22, carrying wheels 23, arranged to bear inwardly against the spring-arms 9, which, as shown, converge upwardly above said rollers, so that when said rollers are raised, or when, conversely, the springs are lowered, the rollers being maintained stationary, the springs will be caused to open and release the suspended insulator. Yoke 22 is provided with an outwardly-extending finger or projection 24, arranged to abut downwardly against the abutment 17, thereby producing the releasing operation just described, when the spindle 4 is being lowered during its non-rotative period. For the purpose of effecting the periodic rotation of spindle 4 I provide a mutilated bevel-gear 25, mounted upon the spindle 4 and in spline engagement therewith, as shown, into the segmental series of teeth 26, whereof meshes a corresponding series of segmental teeth 27 of a mutilated gear 28, mounted on the inner end of shaft 29, carrying the constantly-rotating bevel-gear 14. By this means it will be seen that a one-third revolution is imparted to spindle 4 at the proper time to effect the results just described. The spindle 4 is preferably provided with a stud 30, carrying a terminal roller 31, normally resting upon the edge of cam 12, and the weight of the spindle and its superimposed mechanism is ordinarily sufficient to effect the rapid downward drop, although gravity may be augmented by the use of a spring or counterweight, if necessary.

As thus constructed my device is capable of effective automatic operation, quickly and securely grasping the finished insulators as they are brought into register within the opened molds, and they are raised, thrown around, and gently dropped upon the carrier 16 without danger of breakage or of interference with the other operative portions of the apparatus. It will be understood that the spider-arms 6 may be varied in number—as, for instance, two or four—in which case the actuating mechanism will be correspondingly changed. It will be also understood that various other changes or modifications may be made by the skilled mechanic to effect the same result; but all such changes are to be considered as within the scope of the following claims.

What I claim is—

1. The combination with a traveling mold, of a vertically-movable device arranged to enter downwardly within the mold and to grip the molded article, with means for raising said device and article and for swinging them laterally away from the mold, substantially as set forth.

2. The combination with a traveling mold, of a vertically-movable device arranged to enter downwardly within the mold and to grip the molded article, with means for raising said device and article and for swinging them laterally away from the mold, with automatic devices for disengaging the molded article, substantially as set forth.

3. The combination with a rotatable mold-carrier and molds thereon; of a vertically-reciprocating framework provided with clutch devices adapted to enter downwardly within the mold-cavity and to grasp the finished article, raise it, and swing it laterally away from the mold, substantially as set forth.

4. The combination with an intermittently-rotatable mold-carrier and molds thereon; of a vertically-reciprocating framework provided with clutch devices adapted to enter downwardly within the mold-cavity and to grasp the finished article, raise it, and swing it laterally away from the mold, with means for actuating said mechanism during the stationary period of the mold-carrier, substantially as set forth.

5. Apparatus for removing finished articles from glass-molds consisting of vertically-disposed spring-arms having gripping-terminals, a vertically-movable supporting-frame therefor, means for raising said frame, and means for partially rotating it, substantially as set forth.

6. In apparatus for forming articles of glassware, the combination with a rotatable mold-carrier, and means for intermittently rotating said carrier; of a vertically-movable spindle, means for raising and lowering said spindle, means carried on said spindle for engaging the finished article, and means for actuating said mechanism in conformity with the travel of the mold-carrier, substantially as set forth.

7. Mechanism for grasping and raising a molded insulator consisting of a vertically-movable periodically-rotatable spindle provided with an arm, a stem secured on said arm, downwardly-extending spring-arms provided with gripping-terminals, a vertically-adjustable opening device for the terminals, and an abutment adapted to engage said opening device, substantially as set forth.

In testimony whereof I affix my signature in presence of two witnesses.

JOHN H. CROSKEY.

Witnesses:
 CHAS. S. LEPLEY,
 C. M. CLARKE.